United States Patent
Löhr

(10) Patent No.: US 7,590,125 B2
(45) Date of Patent: Sep. 15, 2009

(54) SIMPLIFIED CONTROL OF A TRANSMISSION NETWORK ELEMENT HANDLING BOTH SDH AND OTH SIGNALS FOR SIGNALS PASSING BOTH SDH AND OTH PARTS

(75) Inventor: Jürgen Löhr, Stuttgart (DE)

(73) Assignee: Alcatel, Paris (FR)

( * ) Notice: Subject to any disclaimer, the term of this patent is extended or adjusted under 35 U.S.C. 154(b) by 851 days.

(21) Appl. No.: 10/423,622

(22) Filed: Apr. 28, 2003

(65) Prior Publication Data
US 2003/0206552 A1 Nov. 6, 2003

(30) Foreign Application Priority Data
May 2, 2002 (EP) ................... 02360141

(51) Int. Cl.
*H04J 14/00* (2006.01)
*G06F 15/173* (2006.01)
*H04L 12/28* (2006.01)

(52) U.S. Cl. ................ 370/401; 709/223; 398/45

(58) Field of Classification Search ......... 370/254–255, 370/465–466, 907, 401; 709/220–221, 223–224; 398/45–46
See application file for complete search history.

(56) References Cited

U.S. PATENT DOCUMENTS

| | | | |
|---|---|---|---|
| 5,799,153 A * | 8/1998 | Blau et al. ............ | 709/223 |
| 6,349,332 B2 * | 2/2002 | Hayball et al. ......... | 709/223 |
| 7,415,207 B2 * | 8/2008 | Lanzone et al. ........ | 398/46 |
| 2002/0019862 A1 * | 2/2002 | Borrett et al. ......... | 709/221 |
| 2003/0014506 A1 * | 1/2003 | Schabernack et al. .... | 709/223 |
| 2003/0158925 A1 * | 8/2003 | Uniacke ............... | 709/223 |
| 2004/0105456 A1 * | 6/2004 | Lanzone et al. ........ | 370/429 |

FOREIGN PATENT DOCUMENTS

EP 0 959 588 A2 11/1999

OTHER PUBLICATIONS

McGuire A: "Management of Optical Transport Networks" Electronics and Communication Engineering Journal, Institution of Electrical Engineers, vol. 11, No. 3, Jun. 1, 1999, pp. 155-163, XP000913198, Ondon, GB.

(Continued)

*Primary Examiner*—Kevin C Harper
*Assistant Examiner*—Nittaya Juntima
(74) *Attorney, Agent, or Firm*—Sughrue Mion, PLLC

(57) ABSTRACT

The present invention relates to a control system of a network element (18) capable of handling transmission signals of an optical transport network (16) (OTN) and transmission signals of a synchronous digital transport network (16) (SDH), the network element (18) comprising a first subsystem (28) for handling trans-mission signals of the optical transport network (16), a second subsystem (30) for handling transmission signals of the synchronous digital transport network (16) and a number of dedicated interconnections (40) between the two subsystems (28, 30), wherein the control system comprises a management information base comprising managed objects (54) related to the first subsystem (28), managed objects (52) related to the second subsystem (30) and a further managed object (56) (interconnection object) related to the number of interconnections (40). The invention further relates to a network element comprising the control system and a method for managing the network element.

27 Claims, 2 Drawing Sheets

OTHER PUBLICATIONS

Romemont De O et al: "Management of SDH Network Elements: An Application of Information Modelling" Electrical Communication, Alcatel., Oct. 1, 1993, pp. 329-337, XP000425698, Paris, France.

Lebender B et al: "SDH Network Element Technology: The Software Platform" Electrical Communication, Alcatel., Oct. 1, 1993, pp. 322-328, XP000425697, Paris, France.

International Telecommunication Union, ITU-T G.709/Y.1331 Feb. 2001, "Series G: Transmission Systems and Media, Digital Systems and Networks" Digital Transmission Systems—Digital networks—Optical transport networks, Interfaces for the optical transport network (OTN), pp. 1-85.

* cited by examiner

\* : Request Interconnection / Release Interconnection

\# : Information about requested interconnection

○  Idle interconnection

●  Occupied interconnection

SIMPLIFIED CONTROL OF A TRANSMISSION NETWORK ELEMENT HANDLING BOTH SDH AND OTH SIGNALS FOR SIGNALS PASSING BOTH SDH AND OTH PARTS

The invention is based on a priority application EP 02 360 141.2 which is hereby incorporated by reference.

FIELD OF THE INVENTION

The present invention relates to a control system of a network element capable of handling transmission signals of an optical transport network (OTN) and transmission signals of a synchronous digital transport network (SDH), the network element comprising a first sub-system for handling transmission signals of said optical transport network, a second sub-system for handling transmission signals of said synchronous digital transport network and a number of dedicated interconnections between the two subsystems. Further, the invention relates to a network element having such a control system and a method for managing such a network element.

BACKGROUND OF THE INVENTION

SDH (synchronous digital hierarchy) and the related SONET are well known digital transport technologies, established in virtually every country in the world. When SDH was first conceived in the early 1990's, telecommunications traffic was predominantly voice. During the last years there has been an explosion in the demand for bandwidths driven mainly by internet excess, e-commerce and mobile telephony. This increase in demand has been satisfied through a combination of increased line rates (TDM—Time Division Multiplexing) and transmitting multiple wavelengths through a single fiber (DWDM—Dense Wave Division Multiplexing).

But as the network evolved to higher line rates, the physical limits of the transport medium (optical fiber) becomes critical. And, there remains an over-riding requirement to control the cost of providing an improving service to customers.

The latest recommendation from the ITU is G.709 "Interface for the Optical Transport Network" (OTN) which builds on the experience and benefits gained from SDH and SONET to provide a route to the next generation optical network. The OTN is therefore regarded as the lifeline to increased bandwidth capacity. Many of the concepts in ITU-T G.709 have their roots in SDH/SONET, for example a layered structure, in-service performance monitoring, protection and other management functions. However, some key elements have been added to continue the cycle of improved performance and reduced cost. These include, for example, management of optical channels in the optical domain.

ITU-T G.709 also provides a standardized method for managing optical wavelength (channels) end to end without the need to convert an optical signal into the electrical domain.

Because of the worldwide use of SDH/SONET technology, there will be a long period of coexistence of the SDH/SONET and the new OTN technology. Hence, the interworking of all these transmission technologies is mandatory for every company offering network elements for transmission networks. The most important network elements are, for example, DWDM (Dense Wavelength Division Multiplexer) systems, ADM (Add Drop Multiplexers) and cross-connects. Cross-connects are, for example, used for providing a connection between an SDH network and an OTH (Optical Transport Hierarchy) network.

This capability of handling transmission signals of two different layers (a layer represents a transmission technology like SDH or OTH) results in a network element having two subsystems, each assigned to one layer. The exchange of signals between both subsystems is achieved by dedicated interconnections between the subsystems.

It is apparent that the aspect of managing such a network element becomes more and more important with the growing complexity and functional integration of such network elements. This has resulted in industry-wide pressure to adopt standardized management interfaces on telecommunications equipment. SDH was, for example, the first major new technology where management features have been incorporated in supporting standards. A detailed overview of management features can be found in the paper "Management of SDH Network Elements: An Application of Information Modelling", O. De Romemont et al., in *Electrical Communication*—$4^{th}$ Quarter 1993, pages 329-338. The contents of this paper is herewith incorporated herein by reference.

In this paper, an OSI system management framework is described providing an overall management model, a generic information model, a methodology for definition of management information and a management protocol for the purpose of communicating management information between two open systems. According to the OSI system management model, a system is composed of a set of resources that exist to provide services to a user. These resources may exist independently of their need to be managed. System management defines a management view of a resource as a managed object (MO), which represents the resource, for the purpose of management, at the interface of the system. The managed object acts as the recipient for the management operations issued by the manager and is responsible for sending reports related to spontaneous events that happen in the system.

All the relevant data is thus encapsulated within MOs and can only be referenced or changed by the defined methods of the MOs. MOs are somewhat specialized compared to the objects in a typical object-oriented approach because they reflect the asymmetry of the manager/agent relationship.

The complete set of managed objects in a managed system constitutes the management information model (management information base) and completely represents the management information that the agent exhibits at its interface to an operation system. These principles have been widely applied in the network element software used by a network element control system. Managed objects within a network element, like the above-mentioned cross-connect, are, for example, the subsystem handling SDH transmission signals and the subsystem handling OTH transmission signals.

Further to the control system of the network element, there is a higher level network management system which is responsible for the management of one or more network elements. Hence, the network element viewpoint is concerned with information that is required to manage a network element as viewed on an individual basis. It provides the capability to install, commission and bring into service the physical and logical resources of the network element and makes them available to higher level management application. This viewpoint is restricted to local information contained within one network element and contains no information relating to connectivity outside the network element. In contrast thereto, the network management viewpoint is concerned with information representing the network both, physically and logically. It is concerned with how network entities are related, topographically interconnected and configured to provide and maintain and to end transport network services.

Referring now again to the above-mentioned cross-connect, its network element control system serves to handle the SDH and OTH subsystems. If, however, a signal has to be sent from one subsystem to the other subsystem, then the network management system of the network element has to select one interconnection between both subsystems and has to configure the subsystems accordingly. This requires that the network management system has knowledge about the number of interconnections between both subsystems within the network element and the status of each of them (already used or not yet used). Hence, this exposes implementation details of the network element to the network management system and makes management of a network more complex.

In prior art approaches, the management system obtains the knowledge about the interconnections between the OTH and SDH subsystems either via explicit configuration by the operator or by requesting this knowledge from the network element control system. Hence, this approach leaves the decision which interconnection to use and the related complexity with the management system.

SUMMARY OF THE INVENTION

In view of the above, it is the object of the present invention to reduce the complexity of the management system.

This object is solved by a control system for a network element with a management information base comprising a managed object (interconnection object) related to the number of interconnections.

In other words, a new managed object is implemented which relates to all physical interconnections between the two subsystems. This new managed object allows the network management system to request the allocation or setup of an interconnection or the release of an interconnection without having any detailed physical knowledge thereof and by simply sending a request for an interconnection to the control system of the network element.

The advantage of this inventive solution is mainly a reduction of complexity on the network management level. This makes the implementation of the network management easier for the user. Further, adding or removing of interconnections between the subsystems does not require that the management system is informed thereabout. This change is encapsulated within the interconnection object in the network element control system.

The basic idea of the present invention is, therefore, to provide for a new managed object relating to a pool of interconnections. The number of dedicated interconnections physically existing are seen by the network management system just as the mentioned pool which retrieves anyone of the interconnections within the pool upon request. Hence, the complexity of the interconnection handling is shifted from the management system to the network element control system.

In a further embodiment of the present invention, the managed interconnection object is adapted to allocate anyone of the dedicated interconnections upon request of a higher level network management system. Preferably, the managed interconnection object is adapted to send back information about the allocated interconnection to the network management system requesting the interconnection.

The object of the present invention is also solved by a method for managing a network element which is capable of handling transmission signals of an optical transport network (OTN), transmission signals of a synchronous digital transport network (SDH) and a number of dedicated interconnections between both networks, characterized by the steps of receiving a request for an interconnection sent by a network management system, allocating an unused interconnection, and sending information about the allocated interconnection to the network management system.

This inventive method has the same advantages as described with reference to the inventive control system.

In a preferred embodiment, the method comprises the steps of searching for an unused not-allocated interconnection, and assigning the status "allocated" to the interconnection found.

Preferably, the method comprises the step of releasing an allocated interconnection upon receipt of a request for releasing sent by the network management system. Preferably, the step of releasing comprises assigning the status "unused" to the interconnection.

The object of the present invention is also solved by a network element comprising the above-mentioned inventive control system. Particularly, the control system comprises a management information base with a managed object related to the number of interconnections for allocating and releasing any of the interconnections upon request of a network management system.

The network element according to the present invention is preferably designed as a cross-connect unit.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

An embodiment of the invention is shown in the drawings and will be explained in more detail in the description below with reference to same. In the drawings.

DETAILED DESCRIPTION OF THE INVENTION

Figure 1:
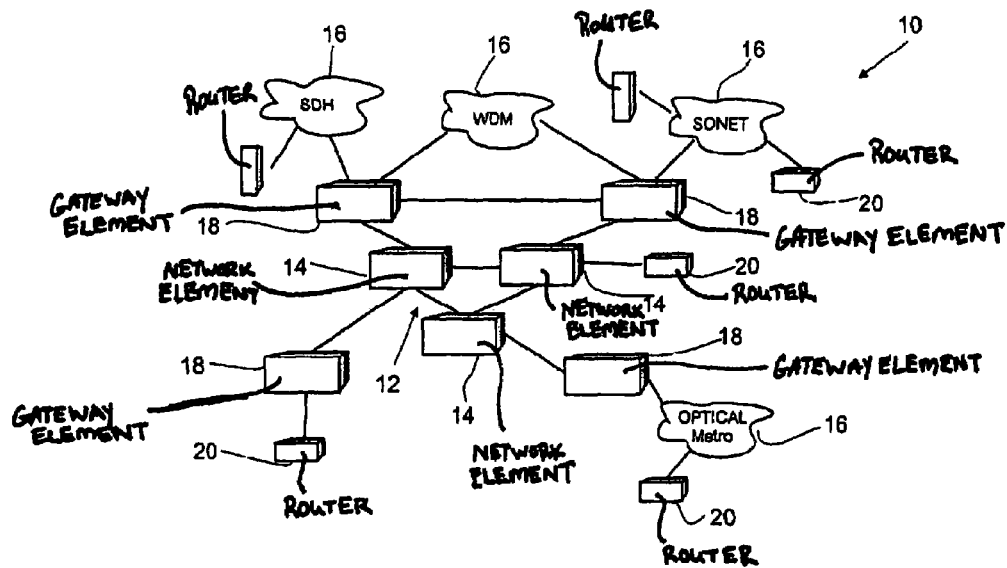
FIG. 1 schematically shows a typical network topology with subnetworks of different layers.

In FIG. 1, a typical topology of a transmission network is shown and referenced with reference numeral 10. The transmission network 10 is built up of a plurality of subnetworks working with different transmission layers. For example, there is an optical core network 12 comprising network elements 14. These network elements are photonic cross-connect units serving to route light through their all-optical switching matrix, and eliminating the optical-electrical conversion typical in existing optical broadband cross-connect systems.

Besides the optical core network 12, further subnetworks based on different transmission layers are shown and referenced with reference numeral 16. These subnetworks are, for example, SDH networks, WDM (Wave Divisional Multiplexing), SONET or optical metro networks.

The network 10 further comprises gateway elements 18 which are gateways between the optical core network 12 and the other shown subnetworks 16.

The network 10 also comprises routers 20 being connected with respective subnetworks 16.

It is apparent from FIG. 1 that the gateways 18 must be able to handle transmission signals of different transmission layers. Particularly, the gateway elements 18 are designed to handle signals of the synchronous digital hierarchy layer on the one hand and signals of the optical transmission hierarchy (OTH) on the other hand.

Such multiservice core gateway units are offered by the applicant of the present invention under the name "1674 Lambda Gate".

Figure 2:
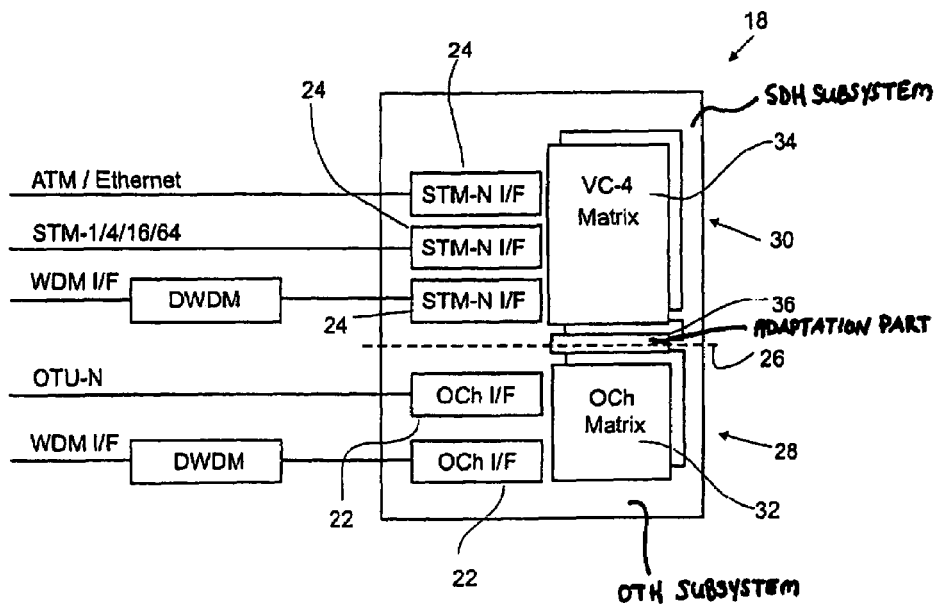
FIG. 2 shows a schematical block diagram of a cross-connect unit.

A schematical diagram of such a gateway 18 is shown in FIG. 2. As can be seen, the gateway comprises a variety of interfaces 22, 24, some of which are handling transmission signals in the optical transmission hierarchy layer, whereas the other interfaces 24 are handling SDH transmission signals.

It is indicated by a broken line 26, that the gateway 18 comprises two subsystems 28, 30, namely an OTH subsystem 28 and an SDH subsystem 30.

The OTH subsystem 28 comprises an OCh matrix 32 and the SDH subsystem 30 comprises a VC-4 matrix 34. These are known parts used for directing signals from an input port to a desired output port.

Further, the gateway comprises an adaptation part 36 which is provided for adapting the signals of one subsystem to the other subsystem.

Figure 3:
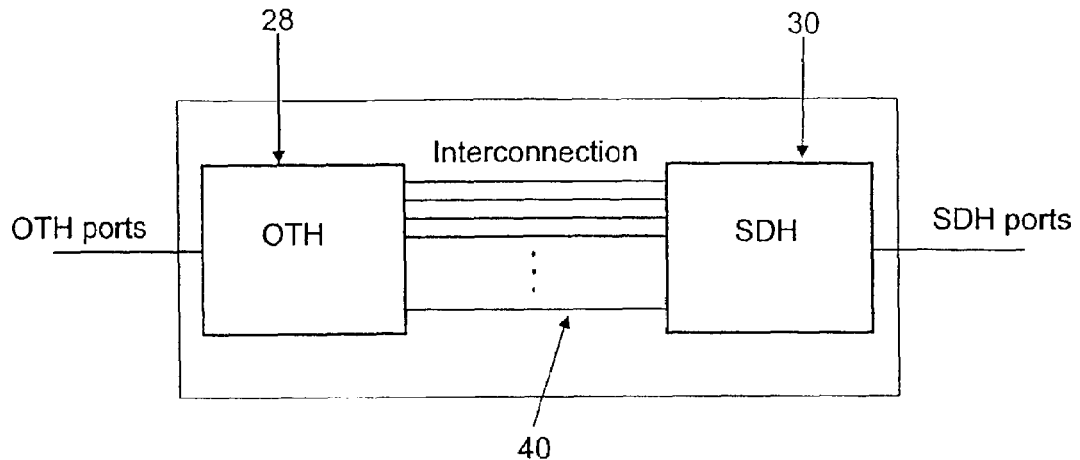
FIG. 3 shows a schematical diagram of a portion of the cross-connect unit.

As already mentioned, the gateway 18 allows to transmit signals from an SDH network 16 to the OTH network 12, for example. This capability requires dedicated interconnections between both subsystems 28, 30. In FIG. 3, such interconnections between both subsystems 28, 30 are schematically shown and referenced with reference numeral 40. The number of such interconnections 40 may be varied and is not fixed to a predetermined value. Hence, it would be possible to add further interconnections if this is required by the respective application.

Figure 4:
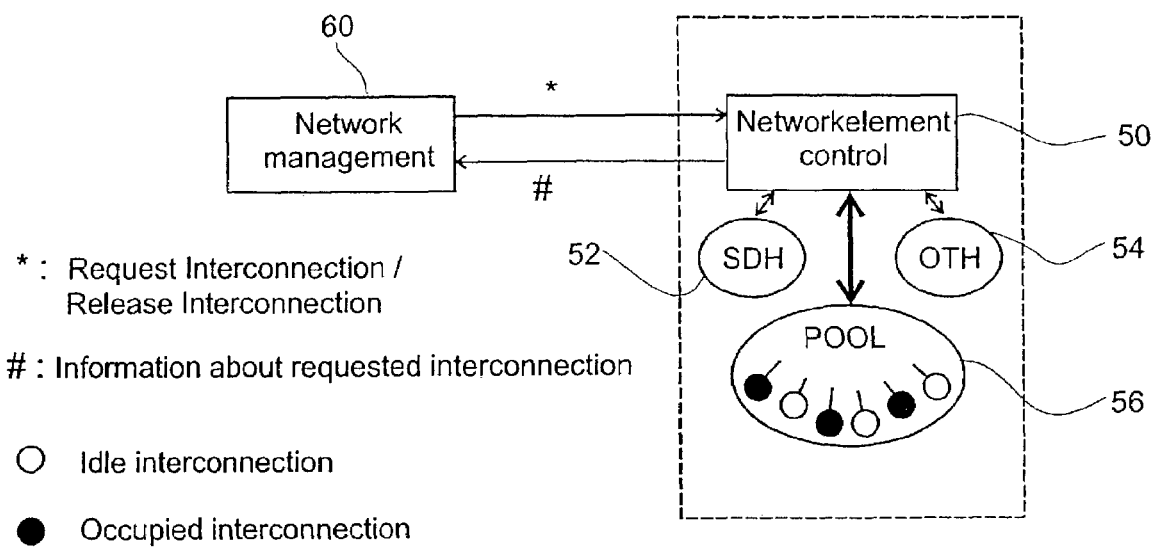
FIG. 4 shows a representation of the management system and the managed objects.

As already mentioned above, the gateway 18 is managed by a control system 50, which is schematically shown in FIG. 4. The control and management of the gateway 18 is achieved by means of managed objects as for example disclosed in "Management of SDH Network Elements: An Application of Information Modelling" by O. De Romemont et al. and for example in "SDH Network Element Technology: The Software Platform" by B. Lebender et al., *Electrical Communication*—4$^{th}$ Quarter 1993, the content of which is herewith incorporated herein by reference.

The network element control system comprises a management information base having managed objects 52 relating to the SDH subsystem and managed objects 54 relating to the OTH subsystem.

Further, the management information base comprises a further managed object referenced with reference numeral 56. This managed object 56 represents all existing dedicated interconnections between the OTH 28 and the SDH 30 subsystem. Just for the sake of a better understanding, the managed object 56 contains a plurality of circles 58, each of which representing one dedicated interconnection. All the functionality of managing the interconnections is hence encapsulated within this object.

On the basis of this new managed object, it is now possible that a higher level network management 60 simply sends a request for an interconnection to the network element control 50 and hence to the managed object 56. It is not necessary for the network management 60 to supply any detailed information about the desired interconnection. Hence, the network management 60 may be operated without any knowledge about the number of interconnections or about any further interconnection attributes.

Upon receipt of a request for an interconnection, the managed object 56 searches for an unused not-allocated interconnection and sends back a respective information to the network management 60. If all interconnections are used, the managed object 56 sends back an error message indicating the busy status of the interconnections.

In FIG. 4, the black and white colored circles 58 indicate that the managed object 56 assigns a status to each dedicated interconnection so that it is always possible to see which interconnections are presently used and which are unused.

To sum up, the new concept of managing interconnections between two subsystems of a network element is to implement a new managed object and hence to shift the complexity of handling interconnections from the management system to the network element control system.

Although the present embodiment has been described with reference to the OSI system management framework, a person skilled in the art knows that other management interfaces may also be used, like CORBA with MTNM models, TL1 or other proprietary protocols and models. The principles of the present invention are therefore not restricted to the OSI management system framework. In the context of the present application, a managed object is to be understood as any instance that represents physical or logical resources for the purposes of management.

It is to be understood that the present invention has been described above in a very simplified manner. This has been done as to improve understanding of the principle of the present invention. A person skilled in the art knows that there are further mechanisms running within the network element control system upon request for an interconnection sent by the network management. For example, one action of the control system upon a request is to configure the SDH and the OTH subsystems accordingly.

It is to be understood that the present invention has been described with reference to a network element handling OTH and SDH signals. However, the present invention may also be applied to network elements handling optical signals other than OTH signals. Hence it is to be noted that the present invention relates to network elements capable of handling transmission signals of any optical transport network.

It is also to be understood that the inventive approach is not restricted to the mentioned subsystems, namely the OTH and the SDH subsystem. Rather, the inventive principles may also be applied to any other network element with interconnections between different subsystems. However, the invention is preferably employed in network elements with SDH and OTH subsystems.

The invention claimed is:

1. A network element in a transmission network, the network element being capable of switching transmission signals of an optical transport network (OTN) and transmission signals of a synchronous digital transport network (SDH), the network element comprising:
   - an OTN subsystem comprising OTN input/output interfaces and a first switch matrix for OTN signals;
   - a SDH subsystem comprising SDH input/output interfaces and a second switch matrix for SDH signals;
   - an interconnection system comprising a number of interconnections between the OTN subsystem and the SDH subsystem; and
   - a control system including managed objects which control the OTN subsystem, managed objects which control the SDH subsystem, and a managed interconnection object which controls the interconnections between the first switch matrix and the second switch matrix.

2. A network element according to claim 1, wherein the managed interconnection object is adapted to allocate any one of the interconnections upon request of a higher level network management system.

3. A network element according to claim 2, wherein the managed interconnection object is adapted to send back information about the allocated interconnection to the network management system requesting the interconnection.

4. A control system according to claim 3, wherein the managed interconnection object searches for an unused, not-allocated interconnection between the OTN subsystem and the SDH subsystem upon receipt of the request for an interconnection from the network management system and sends back the information to the network management system.

5. A network element according to claim 1, wherein the SDH subsystem switches transmission signals of the synchronous digital transport network and the OTN subsystem switches transmission signals of the optical transport network.

6. A network element according to claim 1, wherein the managed interconnection object is common to both the OTN subsystem and the SDH subsystem and provides a pool of interconnections between the OTN subsystem and the SDH subsystem.

7. A network element according to claim 6, wherein the managed interconnection object monitors an availability of each interconnection of the pool of interconnections for both the OTN subsystem and the SDH subsystem and assigns a status to each inter-connection.

8. A network element according to claim 1, wherein the managed interconnection object represents all existing dedicated interconnections between the OTN subsystem and the SDH subsystem.

9. A network element according to claim 1, wherein each of the number of interconnections is a permanent path for transmitting between two defined endpoints, each of the OTN subsystem and the SDH subsystem having one endpoint of the two defined endpoints.

10. A network element according to claim 1, wherein the OTN signals are transmission signals assigned to an OTN transmission layer and the SDH signals are transmission signals assigned to an SDH transmission layer.

11. A method for managing a network element, comprising the following steps:
receiving a request for an interconnection sent by a network management system to a managed interconnection object which is common to both a first subsystem and a second subsystem, provides a pool of interconnections between the first subsystem and the second subsystem, and controls the pool of interconnections between the first subsystem and the second subsystem,
allocating an unused interconnection via the managed interconnection object, and
sending information about the allocated interconnection via the managed interconnection object to the network management system, wherein
the network element is capable of handling transmission signals of an optical transport network (OTN), transmission signals of a synchronous digital transport network (SDH) and a number of dedicated interconnections between both networks,
the first subsystem is an OTN subsystem comprising OTN input/output interfaces and a first switch matrix for OTN signals, and
the second subsystem is a SDH subsystem comprising SDH input/output interfaces and a second switch matrix for SDH signals.

12. A method according to claim 11, wherein the step of allocating comprises:
searching for an unused not-allocated interconnection, and
assigning a status "allocated" to the interconnection found.

13. A method of claim 12, comprising the step:
releasing an allocated interconnection upon receipt of a request for releasing sent by the network management system.

14. A method according to claim 13, wherein the step of releasing comprises assigning a status "unused" to the interconnection.

15. A method according to claim 14, wherein each interconnection of the pool of interconnections is a permanent path for transmitting between two defined endpoints, each of the OTN subsystem and the SDH subsystem having one endpoint of the two defined endpoints.

16. A method according to claim 12, wherein the searching and the assigning the status "allocated" are performed by the managed interconnection object.

17. A method according to claim 13, wherein the releasing is performed by the managed interconnection object.

18. A method according to claim 11, wherein the OTN signals are transmission signals assigned to an OTN transmission layer and the SDH signals are transmission signals assigned to an SDH transmission layer.

19. A network element in a transmission network, the network element comprising:
a first subsystem which switches transmission signals of an optical transport network (OTN) and includes OTN input/output interfaces and a first switch matrix for OTN signals,
a second subsystem which switches transmission signals of a synchronous digital transport network (SDH) and includes SDH input/output interfaces and a second switch matrix for SDH signals,
a number of dedicated interconnections between both subsystems, and
a control system for managing the subsystems and the interconnections,
wherein the control system includes a management information base with a managed interconnection object which controls the number of interconnections by allocating and releasing any of the interconnections upon request of a network management system.

20. A network element according to claim 19, which is a cross-connect unit.

21. A network element according to claim 19, wherein the managed interconnection object is common to both the first subsystem and the second subsystem and provides a pool of interconnections between the first subsystem and the second subsystem.

22. A network element according to claim 21, wherein the managed interconnection object monitors an availability of each interconnection of the pool of interconnections for both the first subsystem and the second subsystem and assigns a status to each interconnection.

23. A network element according to claim 19, wherein the managed interconnection object represents all existing dedicated interconnections between the first subsystem and the second subsystem.

24. A network element according to claim 19, wherein the managed interconnection object searches for an unused, not-allocated interconnection between the first subsystem and the second subsystem upon receipt of a request for an interconnection from the network management system and sends back information about an allocated interconnection to the network management system.

25. A network element according to claim 19, further including a first set of objects related to the first subsystem and a second set of objects related to the second subsystem.

26. A network element according to claim 19, wherein the control system further includes managed objects which control the SDH subsystem and managed objects which control the OTN subsystem,
and the managed interconnection object controls the interconnections between the first switch matrix and the second switch matrix.

27. A network element according to claim 19, wherein the OTN signals are transmission signals assigned to an OTN transmission layer and the SDH signals are transmission signals assigned to an SDH transmission layer.

* * * * *

UNITED STATES PATENT AND TRADEMARK OFFICE
CERTIFICATE OF CORRECTION

PATENT NO. : 7,590,125 B2 Page 1 of 1
APPLICATION NO. : 10/423622
DATED : September 15, 2009
INVENTOR(S) : Jürgen Löhr It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1396 days.

Signed and Sealed this

Twenty-first Day of September, 2010

David J. Kappos
*Director of the United States Patent and Trademark Office*